July 11, 1961 R. M. SIDES 2,992,010
GROCERY CARTS
Filed Dec. 21, 1959 3 Sheets-Sheet 2
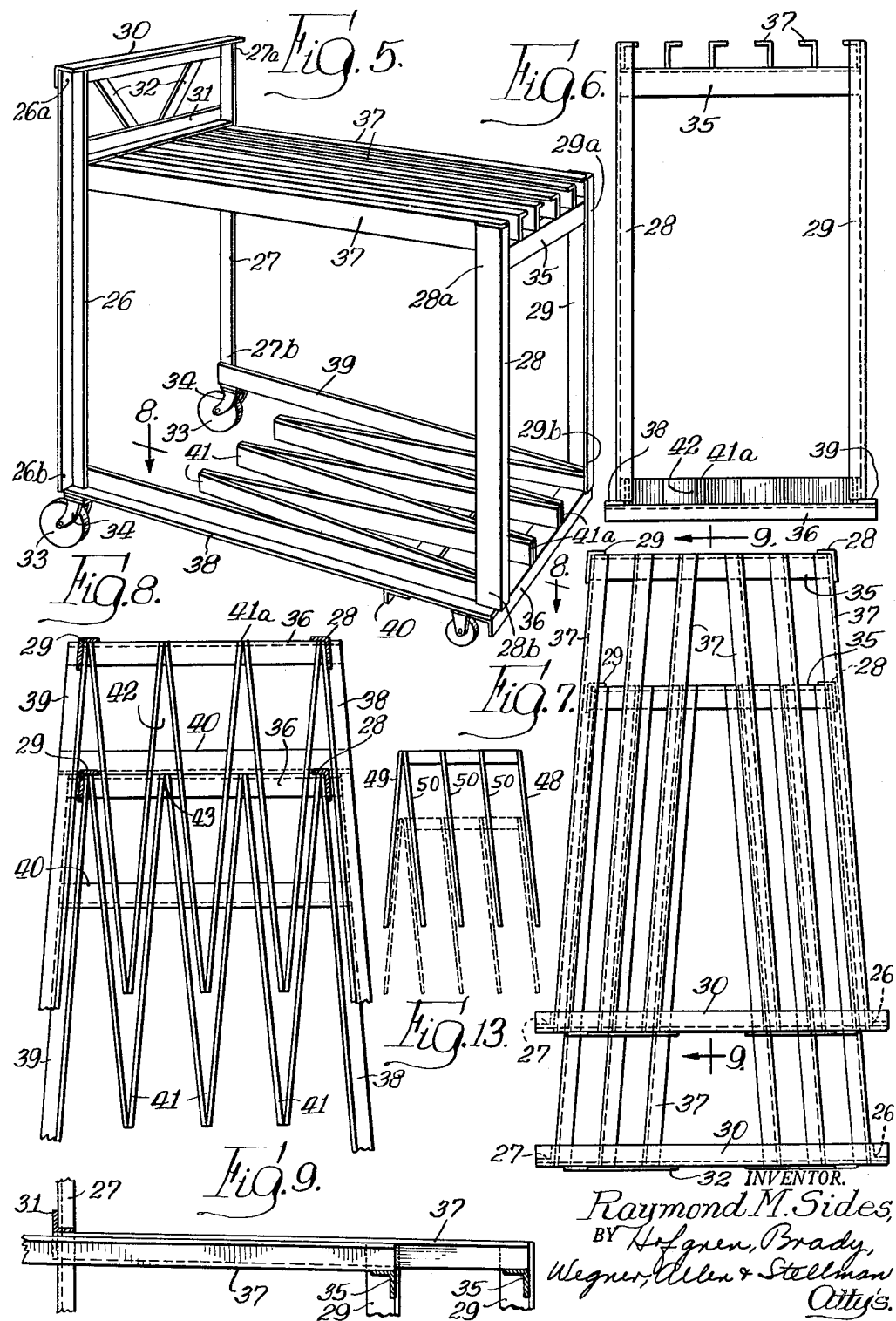
INVENTOR.
Raymond M. Sides,
BY Hofgren, Brady,
Wegner, Allen & Stellman
Attys.

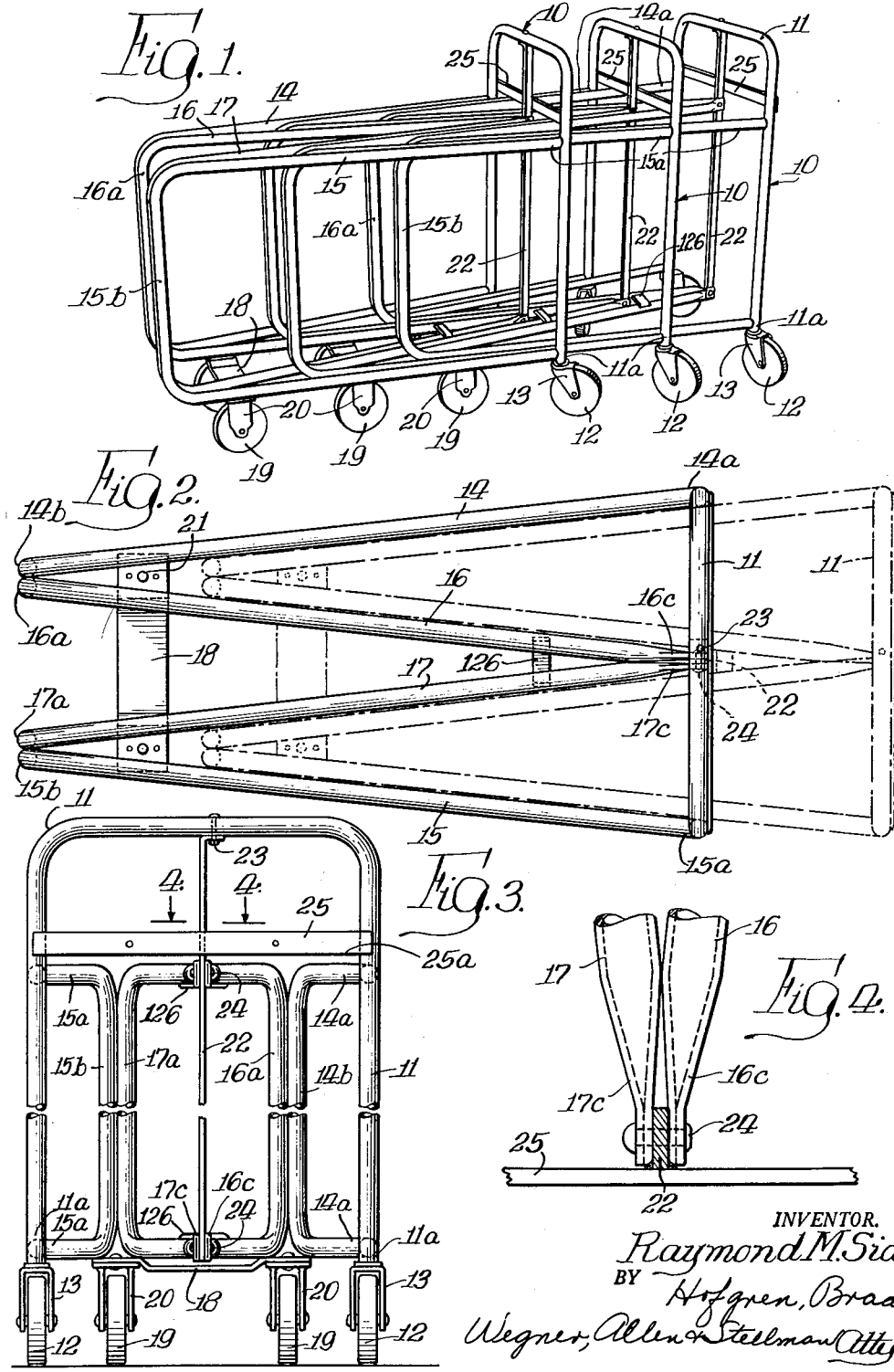

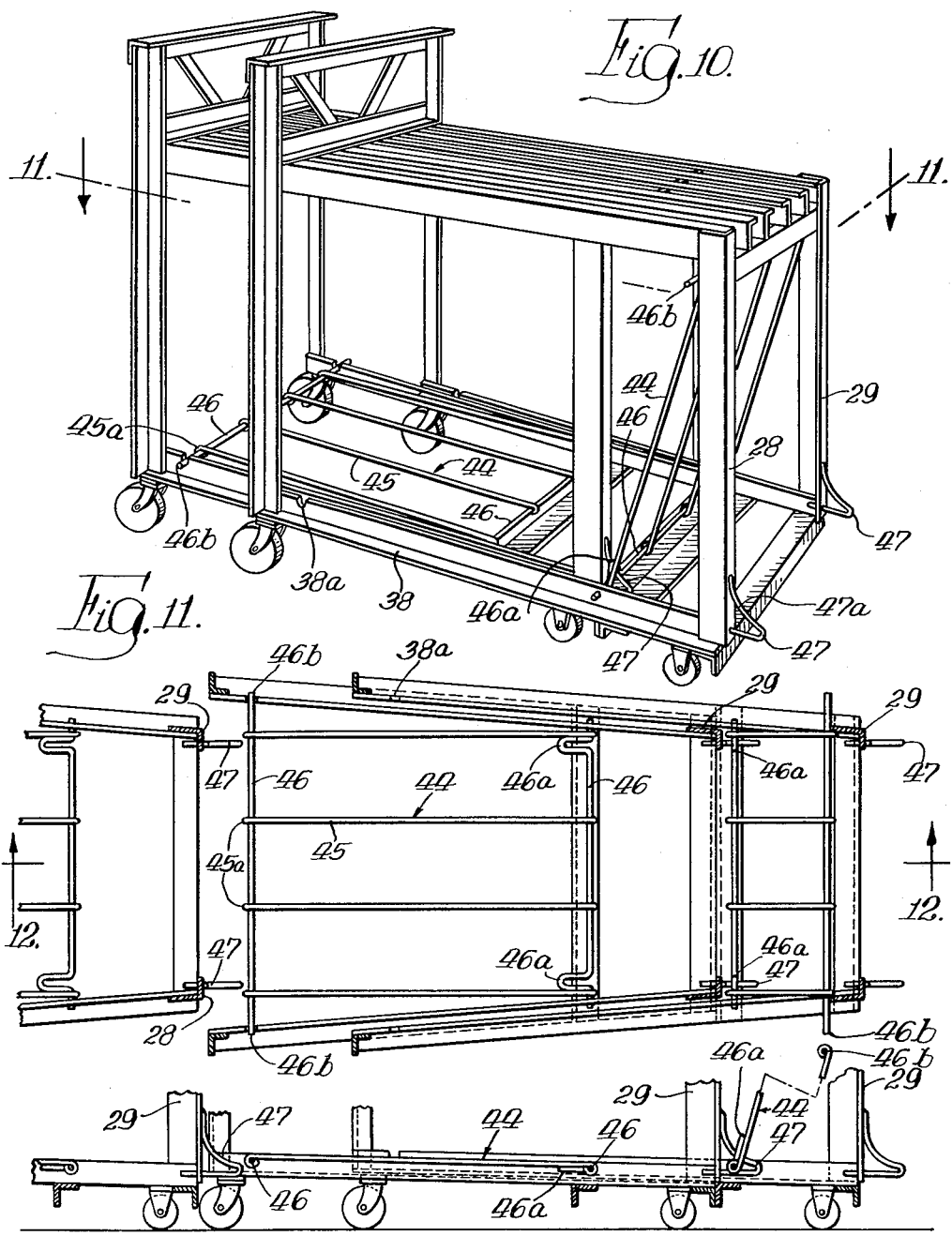

United States Patent Office 2,992,010
Patented July 11, 1961

2,992,010
GROCERY CARTS
Raymond M. Sides, % Tote-Cart, 226 W. Superior St., Northfield 10, Ill.
Filed Dec. 21, 1959, Ser. No. 860,911
13 Claims. (Cl. 280—33.99)

This invention relates to stock carts or trucks and more particularly to movable and nestable stock carts or trucks for use in grocery stores, and the like.

Stock trucks are commonly used in grocery stores, such as large size supermarkets, for moving the inventory of goods to the display shelves in the central portions of the store. Such stock trucks must be constructed of sturdy material and are normally of welded metal construction in order to be strong enough to withstand the heavier loads imposed on such trucks than on the normal grocery carts. Trucks having double decks are generally preferred for such work. The upper decks of such trucks must be supported both front and rear.

Storage of stock trucks of this nature has been a common problem attendant upon their use. Quite normally, they must be lined up side-by-side or end-to-end in some portion of the store and such disposition consumes considerable space. Efforts have been made in the past to provide nestable stock trucks of this type but the double decks, supported both front and rear, have presented many problems. In the only efforts, to date, to solve this problem, the result was unsatisfactory because the decks or carrying portions must first be folded up manually before nesting is possible. Obviously, such manual operations are time consuming and dissatisfying to the user of such a cart.

It is therefore an object of this invention to provide a movable and nestable stock truck which obviates the problems mentioned above.

It is another object of this invention to provide a movable and nestable stock truck or cart which may be easily inserted into a stock truck or cart of similar construction to allow convenient and economical storage.

It is another object of this invention to provide a movable and nestable stock truck which includes a pair of substantially vertically disposed U-shaped members having their legs disposed substantially horizontally and arranged to define upper and lower carrying portions, means for anchoring the bases of said U-shaped members to define the front portion of the truck, means for anchoring the legs of the U-shaped members to define the open rear of said truck, the bases being disposed closer together at the truck front than the legs at the truck rear to provide a tapering rear to front shape for the truck, whereby a truck of similar construction is receivable and nestable through said open truck rear.

It is still another object of this invention to provide a nestable stock truck for use in grocery stores and the like, comprising a pair of W-shaped horizontal frames, one above the other constituting a pair of platforms, an inverted vertically disposed U-shaped frame constituting the back of the cart, the free ends of the W-shaped frames being attached to the legs of said cart back, wheels under the free ends of said back and the forward apices of said lower W-shaped frame, and vertical members connecting the forward apices of said W-shaped frames.

Other objects and advantages of the invention will become apparent from the following description taken together with the accompanying drawings.

In the drawings:

FIGURE 1 is a perspective view of nested stock trucks of one embodiment of this invention;

FIGURE 2 is an enlarged top plan view of one of the stock trucks shown in FIGURE 1, with a second similar stock truck shown in nested position by dotted lines;

FIGURE 3 is a rear elevational view of the stock truck shown in FIGURE 1 partially broken away;

FIGURE 4 is an enlarged partial view taken along the line 4—4 of FIGURE 3;

FIGURE 5 is a perspective view of another embodiment of the stock truck of this invention;

FIGURE 6 is a partial front elevational view of the stock truck shown in FIGURE 5;

FIGURE 7 is a top plan view of the stock truck shown in FIGURE 5 with a second stock truck shown nested therein;

FIGURE 8 is a view taken along the line 8—8 of FIGURE 5;

FIGURE 9 is a view taken along the line 9—9 of FIGURE 7;

FIGURE 10 is a perspective view of a nested pair of stock trucks of yet another embodiment of this invention;

FIGURE 11 is a view taken along the line 11—11 of FIGURE 10;

FIGURE 12 is a view taken along the line 12—12 of FIGURE 11; and

FIGURE 13 is a top diagrammatic view of yet another embodiment.

Referring now to the drawings, there are shown therein, three embodiments of the stock truck of this invention. For ease of description, the embodiment shown in FIGURES 1 through 4 inclusive will be described first.

Three stock trucks 10 are shown nested in the perspective view of FIGURE 1. Each of these trucks is constructed of a tubular metal material and is of welded frame construction. Each of the trucks includes a U-shaped back frame 11 which has a pair of wheels 12 secured to its lower extremities 11a. The wheels 12 are mounted in a U-shaped bracket 13 which is attached to the frame 11a in a freely rotatable manner so that the wheel may turn through an arc of 360° depending upon the direction of motion of the cart.

Attached to the U-shaped back frame 11 are two more U-shaped frames 14 and 15. Each of the frames 14 and 15 is disposed substantially vertically with the legs of the U being disposed substantially horizontally. The ends of the legs 14a and 15a of the frames 14 and 15 are attached to the back frame 11 by welding or bolting. Additional U-shaped frames 16 and 17 are located within the two outer U-shaped frames 14 and 15. Because of the particular location of the frames 14 through 17, it appears on a downward inspection of the truck as shown in FIGURE 2, that a pair of W-shaped frames are provided with forward apices where the outer U-shaped frames 14 and 15 are joined to the frames 16 and 17, and with rear apices where the frames 16 and 17 are joined. The upper W-shaped frame, in effect, defines the upper carrying portion of the cart. A similar lower carrying portion is defined by the lower W-shaped frame.

The front portion of the truck is defined by the vertical bases of the U-shaped members 14 through 17. The members 14 and 16 are welded together along their bases 14b and 16a, and the frames 15 and 17 are also welded together along their bases 17a and 15b. In order to strengthen the front portion of the cart and to provide a location for the front wheels, a plate 18 is welded to the lower portion of each of the frames 14 through 17 adjacent the front portions of the truck. A pair of wheels 19 is attached to the plate 18 by means of a pair of brackets 20. The brackets are riveted at 21 to the plate 18 so that no movement of the brackets is allowed, and thus the wheels 19 are maintained in the position shown in FIGURE 1. However, the wheels 19 may be built to swivel in the same manner as the wheels 12.

The inner two U-shaped frames 16 and 17 are connected together adjacent the back frame 11 by means of an elongated flattened rod 22. The rod is also attached to the center portion of the back frame 11 by means of a rivet 23. The ends of the U-shaped frames 16 and 17 are flattened at 16c and 17c as shown in FIGURE 4 so that the rivets 24 may be passed through these portions of the frames and the flattened rods 22 as more clearly shown in FIGURE 4. This allows for substantially rigid connection of the frames 16 and 17 to the back frame 11 so that a sturdy over-all truck is provided. Further support is provided by a second strap 25 which is welded across the upper portion of the back frame 11. It is to be noted that the strap 25 is located so that its lower edge 25a is higher than the level of the W-shaped upper carrying portion. Another strengthening strap 126 is welded to the legs of the frames adjacent the ends 16c and 17c to provide additional strength to the construction. The upper portion of the back frame 11 constitutes a handle usable for moving the cart.

Because of the open rear construction of the cart 10, it is possible as shown in FIGURE 1 and in dotted lines in FIGURE 2, to insert one cart into another in telescoping fashion to provide efficient storage of the trucks. As can be seen, the front portions of the trucks, as defined by the bases 14b, 16a, 17a and 15b of the U-shaped members, are insertable almost to the plate 18, thus allowing for substantially three-fourths of the truck to be retained within the truck ahead of it, yet the construction provides two sturdy carrying decks.

Referring now to the embodiment shown in FIGURES 5 through 9 inclusive, a stock truck is shown therein which is constructed mainly of L-shaped metal angle iron having welded joints again to provide a sturdy construction. The truck includes four corner angle irons 26, 27, 28 and 29 which are disposed in a vertical position. The angle irons 26 and 27 are connected across their top by a horizontally disposed member 30 which is welded to the upper corners 26a and 27a of the members 26 and 27 and which is usable as a handle for moving the truck. This, in effect, provides a U-shaped rear back frame similar to the frame 11 disclosed in the embodiment of FIGURE 1. A strengthening member 31 is included in horizontal disposition between the members 26 and 27 and is welded thereto as are angularly disposed flat metal bars 32, all of which serve to strengthen the rear portion of the stock cart.

A pair of wheels 33 is attached by brackets 34 to the lower portions 26b and 27b of the vertical members 26 and 27. The brackets 34 are freely rotatable as are the brackets 13 described in the embodiment of FIGURE 1, and have the same function as the wheels of that embodiment.

The vertical members 28 and 29 are connected together by a horizontally disposed member 35 welded adjacent the tops 28a and 29a of the members 28 and 29 and a bottom member 36 welded to the bottoms 28b and 29b of the members 28 and 29. This construction, in effect, provides a square front portion of the cart or truck. A plurality of L-shaped angle irons 37 are welded in position between the strengthening bar 31 and the bar 35 to provide an upper carrying portion. These rods are attached in an inverted L position, as can be seen in FIGURE 6.

The lower portions 26b and 27b of the members 26 and 27 are connected to the lower portions of members 28 and 29 by horizontally extending angle irons 38 and 39 which are welded to the bases of the members 26 and 27 and to the bases of the members 28 and 29. This again provides for substantially rigid, strong construction. A strengthening bar 40 is welded between the members 38 and 39 adjacent the front ends thereof to again increase the rigidity of the entire structure. The joined members 38, 28 and 37 on one side of the cart and the joined members 39, 29 and 37 on the other side provide U-shaped members similar to those shown in the embodiment of FIGURES 1 through 4.

Referring now to FIGURE 7, it can be seen that the members 28 and 29 are disposed more closely together than the members 26 and 27. This, in effect, provides a rear-to-front taper in the over-all cart so that the front of the cart is narrower than the rear of the cart. This allows for one cart to be inserted into another as has already been discussed in regard to the embodiment shown in FIGURE 1. It will also be noted in FIGURE 7 that the angle irons 37 are disposed in a slightly angled position, thus the members 37 to the left of the center of the cart are disposed angularly in parallel relationship with the iron connecting the rods 27 and 29, while the remainder of the angle irons 37 are disposed parallel to the iron connecting the angle irons 26 and 28.

A lower carrying portion is defined by means of a plurality of inverted V-shaped members 41, shown clearly in FIGURE 8 which are welded at their outer ends 41a to the transverse angle iron 36 and to the strengthening rod 40 adjacent their ends 41a. These inverted V-shaped carrying portions 41 are designed to receive their opposite numbers when a cart of similar construction is inserted therein. Referring to FIGURE 8, it can be seen that, for example, the vertex numbered 42 would receive the apex of the lower carrying portion of another truck which may be numbered 43. This allows for easy positioning of one truck within another.

The nesting of the lower V-shaped portions 41 can be clearly seen in FIGURE 8 wherein the lower V-shaped portions of one truck are shown nested within the lower V-shaped portions of another truck.

It will also be noted in FIGURE 9 that the rearward end of the upper platform defined by the rods 37 is slightly higher than the front end of the platform. This allows one platform to be introduced within another. However, this introduction is also facilitated not only by the nesting of the lower V-shaped carrying portion 41 but by the fact that the rods 37 as seen in FIGURE 9 are nestable one within another. Thus, one L-shaped rod or angle iron slides under another L-shaped angle iron until substantially three-quarters of one cart is nested within the other cart in much the same fashion as that described with regard to the embodiment shown in FIGURE 1.

Referring now to the embodiment shown in FIGURES 10 through 12, it will be noted that the truck shown therein is of substantially the same construction as the truck shown in FIGURE 5, with the exception of the lower carrying portion. Therefore, the remainder of the truck shown in FIGURES 10 through 12 will not be described, the description being limited to the lower carrying portion.

The lower carrying portion of this construction is a grate 44 and is constructed of a plurality of parallel wires 45 and of transverse wires 46. The wires 45 are attached to the wires 46 by bending the ends 45a about the wire 46.

A pair of rearwardly extending loops 46a are provided in the front wire 46. These loops are designed to receive the projecting wires 47 which are welded to the front lower portion of the vertical members 28 and 29 when the carts are in nestled position. It is a function of these projecting portions 47 on entrance into an adjacent truck as shown in FIGURE 12 to engage the rear wire 46 of the lower deck 44 to move said deck upwardly. After the rear wire 46 leaves the projections 47 the angle irons 28 and 29 continue lifting the deck 44 until it passes vertical position and assumes the position shown in the first cart of FIGURE 12, at which time the projections enter into the loops 46a of the front wire 46. This allows the second cart to be introduced into a first cart without any mechanical changes or corrections in the construction of the cart. Upon removal of one cart from another, it is simply necessary for the operator to kick the lower deck with his foot, and it will return with normal position.

It is to be noted that the rear wire 46 has free ends 46b which are received in the slots 38a in the members 38. This allows for the proper positioning of the lower deck 44.

Referring once again to FIGURE 12, it can be seen that there are portions of three carts shown therein. Thus, the first cart or the extreme right hand cart has its lower deck in a folded position with the extending portion 47 of the second cart in contact with the loop 46a. The left hand or third cart is just entering into the middle cart and it can be seen that the member 47 is just about to intersect the wire 46. Due to the curvature 47a of the extending member 47, this will lift the rear wire 46 and the lower deck 44 attached thereto slightly so that the incoming cart can pass under it until the angle irons 28 and 29 engage the wire 46 and lift the lower deck thus raising the lower deck entirely out of the way.

Another embodiment of nested tops similar to that shown in FIGURE 7 is shown diagrammatically in FIGURE 13. In this embodiment, the outer two angle irons 48 and 49 are curved slightly inwardly toward each other. However, the remainder of the angle irons 50 are substantially parallel to the right hand angle iron 48.

As can easily be seen from the description of the three embodiments of the trucks of this invention, it is possible to insert one, two, or as many carts together as may be desired while conserving radically on the space necessary for such storage. This is possible due to the construction of each of the carts, each of which has an open rear portion adapted to receive a similar sized cart. Nevertheless, the trucks are provided with double decks which do not have to be folded to allow nesting. Furthermore, the carts or trucks are of sturdy, rigid construction such that they can carry loads necessary for moving stock.

These thrucks, however, have support at all four corners so that the danger of their being tipped over is substantially eliminated. In all commercial two-decked grocery carts or trucks now on the market, there is support for the upper deck only at the rear. There is obviously a substantial danger of these trucks tipping over unless the packages on the upper deck are removed prior to the removal of the packages on the lower deck and even then the danger exists when both decks have a heavy load on them.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. A movable and nestable stock truck or cart for use in grocery stores and the like, comprising: a pair of substantially vertically disposed U-shaped members having their legs disposed substantially horizontally and arranged to define upper and lower carrying portions, said upper carrying portion also including a plurality of elongated L-shaped members arranged between said upper legs, and generally parallel to one of the upper legs of said U-shaped members, means for anchoring said legs to define the open rear of said truck, means for anchoring the bases of said U-shaped members to define the front portion of said truck, wheels disposed beneath said lower carrying portion, said bases being disposed closer together at said truck front than said legs at said truck rear to provide a tapering rear-to-front shape for said truck, whereby a truck of similar construction is receivable and nestable through said open truck rear.

2. The truck or cart of claim 1 wherein said L-shaped members are inverted and half of said members parallel one U-shaped member and the other half of said members parrallel the other U-shaped member.

3. The construction of claim 1 in which the L-shaped members are arranged parallel to one of said U-shaped members.

4. A movable and nestable stock truck or cart for use in grocery stores and the like, comprising: a pair of substantially vertically disposed U-shaped members having their legs disposed substantially horizontally and arranged to define upper and lower carrying portions, said lower carrying portion also including a floor comprising a plurality of unnested V-shaped members; means for anchoring the bases of said U-shaped members to define the front portion of said truck, means for anchoring the legs of said U-shaped members to define the open rear of said truck, wheels disposed beneath said lower carrying portion, said bases being disposed closer together at said truck front than said legs at said truck rear to provide a tapering rear-to-front shape for said truck whereby a truck of similar construction is receivable and nestable through said open truck rear.

5. A nestable stock truck or cart for use in grocery stores and the like, comprising: a pair of W-shaped substantially horizontal frames one above the other constituting a pair of platforms; an inverted vertically disposed U-shaped frame constituting the back of said cart; the free ends of said W-shaped frames being attached to the legs of said cart back; wheels disposed beneath the lower of said pair of W-shaped frames; and vertical members connecting the forward apices of said W-shaped frames.

6. A nestable stock truck or cart for use in grocery stores and the like, comprising: a pair of W-shaped substantially horizontal frames one above the other constituting a pair of platforms; an inverted vertically disposed U-shaped frame constituting the back of said cart; the free ends of said W-shaped frames being attached to the legs of said cart back; wheels disposed beneath the lower of said pair of W-shaped frames; vertical members connecting the forward apices of said W-shaped frames; and a handle on said back.

7. A nestable stock cart for use in grocery stores and the like, comprising a pair of platforms, one above the other, and composed of W-shaped substantially horizontal frame members, the free ends of said frame members being attached to a vertical inverted U-shaped back member; the apices of said W-shaped frame members being connected together by vertical members; wheels disposed beneath the lower of said pair of W-shaped frames and a handle on said back member, the space between the legs of said back member being unimpeded and being substantially wider than the space between the forward apices of said platform members whereby the back member may receive the forward end of a cart of similar construction for nesting purposes.

8. The construction of claim 7 wherein the middle apices of said platform members are connected by a vertical member at the back of said cart.

9. The construction of claim 8 wherein said vertical support member for the middle apices of the platforms is also connected to the U-shaped frame.

10. The construction of claim 7 wherein the middle apex of the lower platform has support members between its two legs.

11. A movable and nestable stock truck or cart for use in grocery stores and the like, comprising: a substantially horizontal upper deck and a deck thereunder, said upper deck including a pair of forwardly converging outer support members and a plurality of inner support members substantially parallel to at least one of said outer members and substantially permanently disposed between said outer members and adapted to cooperate with said outer members to support items of less dimensions than the least spacing between said outer members, a pair of vertical support members connecting said decks at the front corners thereof, an inverted U-shaped frame member support connecting the back corners thereof, and means allowing movement of said truck disposed under said lower deck, said decks being so constructed and arranged that a truck of similar construction is automatically received and nestable therein.

12. The truck or cart of claim 11, wherein said lower deck includes a substantially rigid grate which is rotatably mounted at its front end and is adapted to be automatically swung to a substantially vertical out-of-the-way position by the entry of a similar truck.

13. A movable and nestable stock truck or cart for use in grocery stores and the like, comprising: a pair of substantially vertically disposed U-shaped members having their legs disposed substantially horizontally and arranged to define upper and lower carrying portions, the upper carrying portion including a pair of forwardly converging outer support members and a plurality of inner support members substantially parallel to at least one of said outer members, and substantially permanently disposed between said outer members and adapted to cooperate with said outer members to support items of less dimensions than the least spacing between said outer members, means for anchoring the legs of said U-shaped members to define the open rear of said truck, said bases being disposed closer together at said truck front than said legs at said truck rear to provide a tapering rear-to-front shape for said truck, whereby a truck of similar construction is receivable and nestable through said open truck rear.

References Cited in the file of this patent

UNITED STATES PATENTS

| | | |
|---|---|---|
| 2,639,161 | Goldman | May 19, 1953 |
| 2,738,201 | Spears | Mar. 13, 1956 |
| 2,764,419 | Enders | Sept. 25, 1956 |
| 2,818,267 | Watson | Dec. 31, 1957 |
| 2,928,681 | Wilson | Mar. 15, 1960 |